United States Patent [19]

Radtke

[11] Patent Number: 4,722,871
[45] Date of Patent: Feb. 2, 1988

[54] ZINC-ALUMINUM ALLOY COATINGS FOR STEEL

[75] Inventor: Schrade F. Radtke, New Canaan, Conn.

[73] Assignee: Cosmos Engineering, Inc., New Canaan, Conn.

[21] Appl. No.: 896,408

[22] Filed: Aug. 14, 1986

[51] Int. Cl.⁴ .............................................. B32B 15/18
[52] U.S. Cl. .................................... 428/653; 420/514; 420/515; 420/531; 420/540; 428/659
[58] Field of Search ............... 420/514, 515, 531, 537, 420/540; 428/653, 659

[56] References Cited

U.S. PATENT DOCUMENTS 3,343,930  9/1967  Borzillo et al. ..................... 428/653
3,782,909  1/1974  Cleary et al. ....................... 428/653
4,448,748  5/1984  Radtke et al. ...................... 420/514
4,456,663  6/1984  Leonard ............................. 428/653

Primary Examiner—L. Dewayne Rutledge
Assistant Examiner—Robert L. McDowell
Attorney, Agent, or Firm—Paul J. Cook

[57] ABSTRACT

A zinc-aluminum alloy coating having desirable ductile properties and a uniform fine grain structure having excellent wettability for a ferrous metal substrate comprises greater than about 25 percent by weight aluminum and zinc, wherein the alloy further includes from about 0.1 to about 1.0 percent by weight of a rare earth alloy for enhancing the wettability of the alloy to the ferrous metal and the balance comprises additional additives and impurities. With alloys having increased concentration of aluminum, the solubility of the rare earth alloy is increased, thereby increasing wettability.

8 Claims, No Drawings

ZINC-ALUMINUM ALLOY COATINGS FOR STEEL

BACKGROUND OF THE INVENTION

1. Field of the Invention

The present invention relates to zinc-aluminum coatings on a steel substrate.

2. Prior Art

Zinc-aluminum alloys have long been investigated as corrosion resistant coatings for iron and steel. Principally, a Zn-5% Al alloy and a 55% Al alloy coatings have been commercialized. The Zn-5% Al alloy is offered in two variations of the basic composition, one with additions of mischmetal to high purity zinc and the other with small additions of magnesium to a lower grade of zinc to compensate for the impurities in the zinc.

U.S. Pat. No. 4,448,748 to myself and others relates to the low aluminum content alloy containing from about 85% to about 97% zinc, from about 3% to about 15% aluminum and from about 5 ppm to about 1.0% mischmetal. The alloy may also contain one or more of the elements Fe, Pb, Sb, Mg, Sn, Cu and Si. This patent in comparing the mischmetal-containing Zn-5% Al coating to the high aluminum coating, Zn-55Al-1.5 Si, in column 4, lines 56–59, sets forth the superiority of the low aluminum mischmetal alloy.

The Zn-55% Al alloy employed commercially is nominally 55% Al, 43.5% Zn and 1.5% Si. Protective zinc-aluminum surface coatings containing relatively large amounts of aluminum were developed as set forth in U.S. Pat. Nos. 3,343,930 and 3,393,089 to take advantage of the improved oxidation resistance of aluminum and oxidation resistance under certain environments when compared with conventional lower aluminum content alloys. Silicon additions are required to these compositions to reduce the reactivity between the basic Zn-55% Al alloy and the steel substance during the coating operation when preheated steel sheet or wire is passed through the molten zinc-aluminum alloy bath. In spite of improvements exhibited by these higher aluminum content alloys, difficulties have been encountered in their production and with their use. The desirable favorable properties can not readily be achieved in practice.

In continuous galvanizing processes which include a pretreatment operation in a reducing atmosphere of hydrogen, the use of aluminum at a concentration above about 10% in the coating bath tends to create serious operating difficulties because of problems with these zinc-aluminum alloy baths. During the coating operation, it is difficult to achieve complete coverage of the substrate and bare spots occur. These sites or bare spots are foci for failure of the coating penetration of a corrosive medium. A large number of bare spots can cause premature corrosion of the composite coated steel.

Other factors contribute to the greater corrosion tendencies of the Zn-55% Al alloy. The higher aluminum alloy has a tendency to form a coarse grained structure composed of an aluminum-rich phase, a zinc-rich phase and particles of silicon. The large grain structure limits the thickness of the coating which can be applied due to the inherent instability of large grains as a coating. Less protection is afforded by thin coatings which can pit causing premature rusting.

The characteristic grain structure of the Zn-55% Al alloy sets up a series of electrolytic cells of anodes and cathodes formed by the varying chemistry of the grains in the coating. The silicon behaves in a manner cathodic to the zinc-rich and aluminum-rich phases and the aluminum-rich phase behaves in a manner cathodic to the zinc-rich phase. As a result, the zinc-rich phase in a corrosive medium cathodically protects the aluminum-rich phase and corrodes yielding a pitting type corrosion.

These electrolytic cells are a basic problem with the aforementioned alloy system. It causes a further problem with material that is painted, particularly material that is painted on a continuous coil coating line. At the edges of the painted sheet where it is cut, corrosion occurs. This corrosion is further accentuated by the anode-cathode behavior of the two major components of the metallic coating; namely, the zinc-rich phase versus the aluminum-rich phase. As corrosion products are formed by the action of the zinc-rich phase protecting the aluminum-rich phase, the oxidation products lift the paint film away from the metallic coating. As the film is lifted, a new corrosion mechanism; namely, differential aeration cell formation takes place accelerating the lifting of the paint film causing unsightly areas. This failure of painted material is called edge creep and is a serious weakness of zinc-55% aluminum alloy.

Additional problems with coatings in the higher aluminum range have been recognized in the prior art. Higher aluminum content coatings have limited ductility. The smaller the radii of bends made in the coated steel, the greater the degree of cracking in the coating. On the bases of these facts, it is recognized, as set forth in U.S. Pat. No. 4,152,472 to Ohbu et al, in column 3, that the baths containing lower aluminum concentrations, on the order of from 3% to 10%, are preferably used since adherent coatings are more easily achieved.

Prior art attempts to deal with the problems of the higher aluminum alloys concentrate on surface or substrate modification. Note that U.S. Pat. No. 4,330,598 to Lee et al requires the use of a low alloy low-carbon steel strip containing between about 0.03 to 0.1% carbon having titanium as an essential alloying element in the substrate.

SUMMARY OF THE INVENTION

It is therefore an object of the present invention to provide a coating for ferrous metal of the zinc alloy type having a high aluminum content which has improved resistance to a corrosive environment.

Another object of the present invention is to provide a coating of the aforementioned type which is particularly adapted for the later application of a paint coating thereon.

Another object of the present invention is to obviate one or more deficiencies of prior art processes by providing a coating of the aforementioned type without necessitating uneconomical substrate modification.

Other features, advantages and objects will become apparent to those skilled in the art from the following description.

The zinc-aluminum alloy coating of the present invention which is ideally suited for a ferrous metal substrate has desirable ductile properties and a uniform fine grain structure. The alloy coating comprises between about 25 and 75% weight percent aluminum, between about 0.1 and 1.0 weight percent of a rare earth alloy for enhancing the wettability of the alloy to the ferrous metal, between about 1.5 and 3.0 weight percent silicon, the balance being zinc. Additional ingredients or impurities which do not effect the desirable properties can also be included in the present invention.

Additionally, the alloy preferably includes from about 0.01 to about 0.02 percent by weight of a grain refinement additive selected from the group consisting of titanium, zirconium, boron or carbon, singly or in combination.

DETAILED DESCRIPTION

The present invention is directed to an improvement in the Zn-55 Al-1.5 Si alloy as described in U.S. Pat. Nos. 3,343,930 and 3,393,089. The alloy of this invention comprises at between about .25 and 75% weight percent aluminum, between about 0.1 and 1.0 weight percent of a rare earth alloy comprising a mischmetal for enhancing the wettability of the alloy for ferrous metal, between about 1.5 and 3.0 weight percent silicon, the balance being zinc.

In accordance with the principles of the present invention, the high aluminum content alloy includes a rare earth alloy. Such rare earth alloy improves the wettability of the alloy to steel and is present in an amount from about 0.1 to about 1.0 percent by weight, depending on the Al content.

Typical rare earth alloys are offered commercially as cerium-rich or lanthanum-rich alloys known as mischmetal. For example, two typical cerium mischmetals have the following compositions in weight percent:

1. Ce 45-60; other rare earths 35-50, the balance comprising Fe, Mg, Al, Si and impurities.
2. Ce 52.7; other rare earths 47.5, Fe 0.04, Mg 0.28, Al 0.08, Si 0.27 and the balance impurities.

Typical lanthanum mischmetals are represented by the following compositions:

1. La 60-90; Ce 8.5, Nd 6.5, Pr 2, the balance comprising Fe, Mg, Al and Si as well as possible impurities.
2. La 83, Ce 8.5, Nd 6.5, Pr 2, Fe 0.2, Mg 0.03, Al 0.18, Si 0.43 and the balance impurities.

Also, in accordance with a preferred embodiment of the present invention, the alloy as described above, includes further additions of a grain refinement additive selected from the group consisting of titanium, zirconium, boron or carbon, singly or in combination. Such additions are preferably present in an amount from about 0.01 to about 0.02 percent by weight. Of these elements, zirconium is most preferred for yielding a fine grained lamellar eutectic structure. The grain refinement additions promote the formation of a reduced grain size. As the size of the individual grains of the two metals, zinc and aluminum are reduced, the electrochemical differences between the two phases are reduced. These additions provide a more ductile and uniform structure and minimize the anode-cathode behavior of the zinc-rich and aluminum-rich phases during corrosion.

Also, in accordance with a preferred embodiment of the present invention, the alloy as described includes further additions of copper for improving the corrosion resistance. Copper is added in an amount sufficient to reduce the effective electrochemical potential of the zinc-rich phase so that it will electrochemically match the potential of the aluminum-rich phase. Such addition is preferably present in an amount from about 0.05 to about 1.5 percent by weight.

The balance of the alloy in weight percent may include additional intentional additives other than those discussed above or impurities. Such additions should not be to such an extent to unfavorably affect the the desirable properties of the alloy of the present invention as discussed above and hereinafter described. Such additions are preferably present in an amount less than about 3.5 percent by weight and even more preferably less than about 1.5 percent by weight.

Impurities should not exceed the following amounts: Fe 0.10%, Pb 0.004%, Cd 0.003% and Sn 0.002%. Preferred coating weights range from 80 to 300 gms/m$^2$, depending on the alloy composition.

The preferred method of coating a ferrous metal strip with the coating of the present invention is by a continuous hot-dip coating process. A steel sheet of strip, precleaned and free of rust and rolling oils, is fed continuously from a coil into a furnace containing a reducing atmosphere of nitrogen and hydrogen operating at a temperature of from about 730° C. to 950° C. to anneal the strip. After annealing, the strip is cooled to a temperature of from about 450° C. to 650° C., depending on the coating bath employed, and is then fed into the desired hot-dip zinc-aluminum coating bath through a protective hood to prevent oxidation of the sheet steel surface before it enters the coating bath.

The bath composition is as hereinbefore described with reference to the alloy composition. The additives previously referred to are desirably present to give the enhanced features of the present invention. After leaving the hot-dip zinc-aluminum coating bath, the coating thickness on the strip is regulated by a pair of oppositely disposed air knives or wipers which produce uniform and controlled coating thickness.

To enhance the small grain formation which is promoted by the additives of the present invention, it is desirable to cool the strip by quenching at a rate of at least 200° to 400° C. per second or higher. A variety of quenching systems can be utilized such as steam, water or extremely fine sprays that will provide the cooling rate. The rapid quenching together with the composition of the bath prepared in accordance with the alloy composition of the present invention promotes the formation of an extremely fine structure which is unidentifiable under an ordinary microscope. This submicroscopical structure requires an electron microscope to reveal the structure. The extremely fine structure is desirable to provide an electrochemically neutral surface having anode/cathode areas, or cells, that are so fine that under corrosive conditions, the entire surface behaves in a uniform manner, thus lessening the pitting that is prevalent in prior art structures. The uniform fine-grain structure also contributes to increased ductility which is desirable for forming and drawing operations.

I claim:

1. A zinc-aluminum alloy coating for a ferrous metal substrate consisting essentially of between about 25 and 75 percent by weight aluminum, from about 1.0 to about 3.0 percent by weight silicon, from about 0.1 to about 1.0 percent by weight of a mischmetal rare earth alloy for enhancing the wettability of the alloy to the ferrous metal, the balance comprising zinc.

2. A zinc-aluminum alloy coating for a ferrous metal substrate according to claim 1 including from about 0.01 and 0.02 percent by weight of a grain refinement additive selected from the group consisting of titanium, zirconium, boron, carbon and mixtures thereof.

3. A zinc-aluminum alloy coating for a ferrous metal substrate according to any one of claims 1 or 2 including between about 0.05 and 1.5 percent by weight copper. as an additional ingredient.

4. A ferrous metal strip having a zinc-aluminum alloy coating consisting essentially of between about 25 and 75 percent by weight aluminum, from about 1.0 to about 3.0 percent by weight silicon, from about 0.1 to about 1.0 percent by weight of a mischmetal rare earth alloy for enhancing the wettability of the alloy to the ferrous metal, the balance comprising zinc, said coating being ductile and having a uniform fine-grained structure.

5. A ferrous metal strip having a zinc-aluminum alloy coating according to claim 4 including from about 0.01 to about 0.02 percent by weight of a grain refinement additive selected from the group consisting of titanium, zirconium, boron, carbon and mixtures thereof.

6. A ferrous metal strip having a zinc-aluminum coating according to any one of claims 4 or 5 including between about 0.05 and 1.5 percent by weight copper.

7. A ferrous metal strip having a zinc-aluminum coating according to any one of claims 4 or 5 having a uniform coating weight of from about 80 to about 300 gms/m$^2$.

8. A ferrous metal strip according to any one of claims 5 or 6 having a uniform coating weight of from about 80 to about 300 gms/m$^2$ and wherein said coating includes between about 0.05 and 1.5 percent by weight copper.

* * * * *